(12) United States Patent
Chrysanthakopoulos et al.

(10) Patent No.: US 7,664,997 B2
(45) Date of Patent: Feb. 16, 2010

(54) FAILURE HANDLING AND DEBUGGING WITH CAUSALITIES

(75) Inventors: Georgios Chrysanthakopoulos, Seattle, WA (US); Andreas Ulbrich, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 11/455,581

(22) Filed: Jun. 19, 2006

(65) Prior Publication Data

US 2008/0010564 A1   Jan. 10, 2008

(51) Int. Cl.
G06F 11/00     (2006.01)

(52) U.S. Cl. .......................... 714/57; 714/15

(58) Field of Classification Search .............. 714/26, 714/46, 15, 37–38, 48, 50, 57; 706/46; 719/318; 712/244
See application file for complete search history.

(56) References Cited

U.S. PATENT DOCUMENTS

| | | | |
|---|---|---|---|
| 5,661,668 A * | 8/1997 | Yemini et al. ............... | 702/186 |
| 5,970,248 A | 10/1999 | Meier | |
| 6,016,558 A | 1/2000 | Seong et al. | |
| 6,042,614 A | 3/2000 | Davidson et al. | |
| 6,314,531 B1 | 11/2001 | Kram | |
| 6,438,713 B1 | 8/2002 | Taira et al. | |
| 6,701,513 B1 | 3/2004 | Bailey | |
| 6,807,583 B2 | 10/2004 | Hrischuck | |
| 6,829,719 B2 * | 12/2004 | Anvin et al. ................... | 714/2 |
| 6,883,162 B2 | 4/2005 | Jackson et al. | |
| 6,918,053 B1 * | 7/2005 | Thatte et al. .................. | 714/16 |
| 7,380,166 B2 * | 5/2008 | Thatte et al. .................. | 714/20 |
| 2002/0174415 A1 | 11/2002 | Hines | |
| 2003/0149919 A1 * | 8/2003 | Greenwald et al. ............ | 714/43 |
| 2003/0233636 A1 | 12/2003 | Crawford | |
| 2004/0010778 A1 | 1/2004 | Kaler et al. | |
| 2004/0073658 A1 | 4/2004 | Oran et al. | |
| 2004/0107414 A1 * | 6/2004 | Bronicki et al. ............. | 717/105 |
| 2005/0034024 A1 | 2/2005 | Alverson et al. | |
| 2005/0137832 A1 * | 6/2005 | Yemini et al. ............... | 702/183 |
| 2005/0193286 A1 * | 9/2005 | Thatte et al. .................. | 714/48 |
| 2005/0209861 A1 | 9/2005 | Hewes et al. | |
| 2005/0210133 A1 | 9/2005 | Florissi et al. | |
| 2005/0267772 A1 | 12/2005 | Nielsen et al. | |
| 2007/0101179 A1 * | 5/2007 | Chafle et al. .................... | 714/4 |

OTHER PUBLICATIONS

Aguilera, et al., "Performance Debugging for Distributed Systems of Black Boxes",SOSP '03, Oct. 19-22, 2003, Bolton Landing, New York, USA.
Elshoff, I.J.P, "A Distributed Debugger for Amoeba", Publication Date: 1989, pp. 1-10, ACM Press, NY, USA.
Farchi, et al., "Effective Testing and Debugging Techniques for a Group Communication Systems", 2005 International Conference on Dependable Systems and Networks (DSN/05).
Side, et al., "A Debugger for Distributed Programs", Software-Practise and Experience, Publication Date: May 1994, pp. 507-525, vol. 24(5).

* cited by examiner

Primary Examiner—Dieu-Minh Le

(57) ABSTRACT

Various technologies and techniques are disclosed that improve failure handling and debugging in message driven environments. A diagramming tool allows a user to graphically nest one or more functional components of the data flow diagram to create a fault handler. The fault handler is associated with a failure component to be called when a failure occurs within any one or more of the nested functional components. One or more application executables are synthesized from the data flow diagram. When the nested component is created at runtime, a causality is created for the nested component. The causality has an exception port for receiving fault messages that are unhandled within the nested data flow associated with the nested component. The causality also has a coordination port to allow any messages in the causality context and/or other applications to access the error history and the message coordination history.

13 Claims, 17 Drawing Sheets

FAILURE HANDLING AND DEBUGGING WITH CAUSALITIES

BACKGROUND

Distributed asynchronous message driven systems are inherently complex when it comes to handling partial failures. Data flow diagrams can be used to describe and design the staged computation in distributed message driven systems by showing how messages flow between components. Data flow diagrams can drive the automatic synthesis of application executables, i.e. source code can be generated from data flow diagrams.

Data flow diagrams, however, have limitations when it comes to partial failure handling. In a data flow, a failure manifests as a fault message. The functional path of a data flow can be instrumented with junctions for fault messages. However, this approach is unfeasible for handling failures because multiple different failures can occur at any stage (partial failure) and can affect parallel data flows. Furthermore, multiple instances of a data flow can be active at the same time. For this reason, capturing which part in which instance of a data flow is affected by which kind of failure would require diagramming all combinations of data paths under faults. Such an approach is simply unfeasible in most situations.

Distributed asynchronous message driven systems are also inherently complex to debug. Traditional stack-based debuggers are not typically useful in distributed asynchronous environments since local stacks are meaningless. Similarly, setting traditional breakpoints on source code lines is also of little value in such an environment since multiple instances of the same lines of code are running concurrently with each other.

SUMMARY

Various technologies and techniques are disclosed that improve failure handling and debugging in message driven environments. A diagramming tool allows a user to graphically nest one or more functional components of the data flow diagram to create a fault handler. The fault handler is associated with a failure component to be called when a failure occurs within any one or more of the nested functional components. One or more application executables are synthesized from the data flow diagram. When the nested component is created at runtime, a causality is created for the nested component. The causality has one or more exception ports (local and/or serialized) for receiving fault messages that are unhandled within the nested data flow associated with the nested component. The causality also has a coordination port to allow any messages in the causality context and/or other applications to access the error history and the message coordination history.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
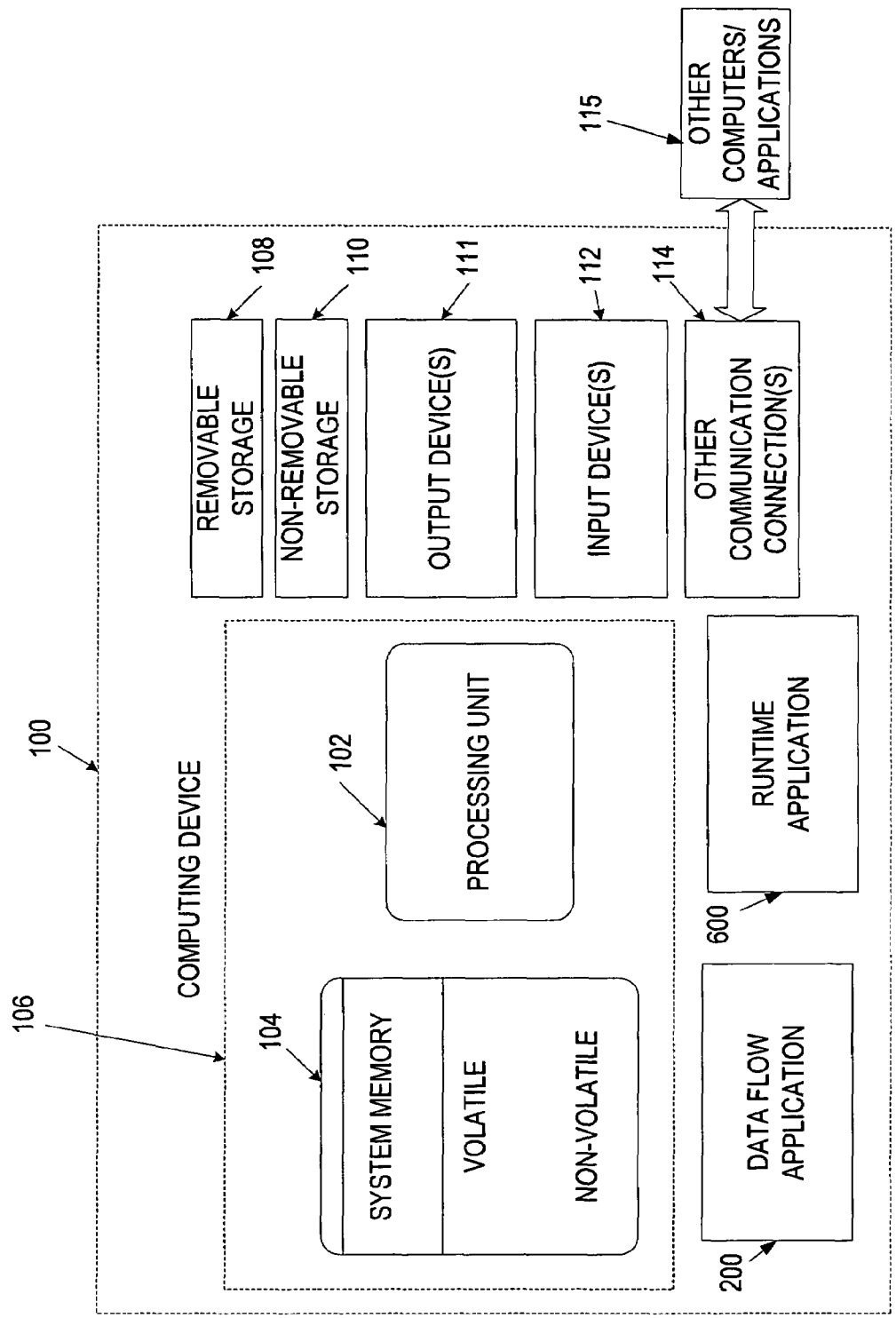
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as software development environment and/or a runtime environment, but the system also serves other purposes in addition to these. In one implementation, one or more of the techniques described herein can be implemented as features within a visual programming or data flow diagramming tool, or from any other type of program or service that provides a data flow language. As one non-limiting example, one or more programming or data flow diagramming tools generate one or more executables that leverage the functionality of the runtime. In another implementation, one or more of the techniques described herein are implemented as features with other applications that deal with executing and/or or interfacing with asynchronous messages for an application.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Figure 12:
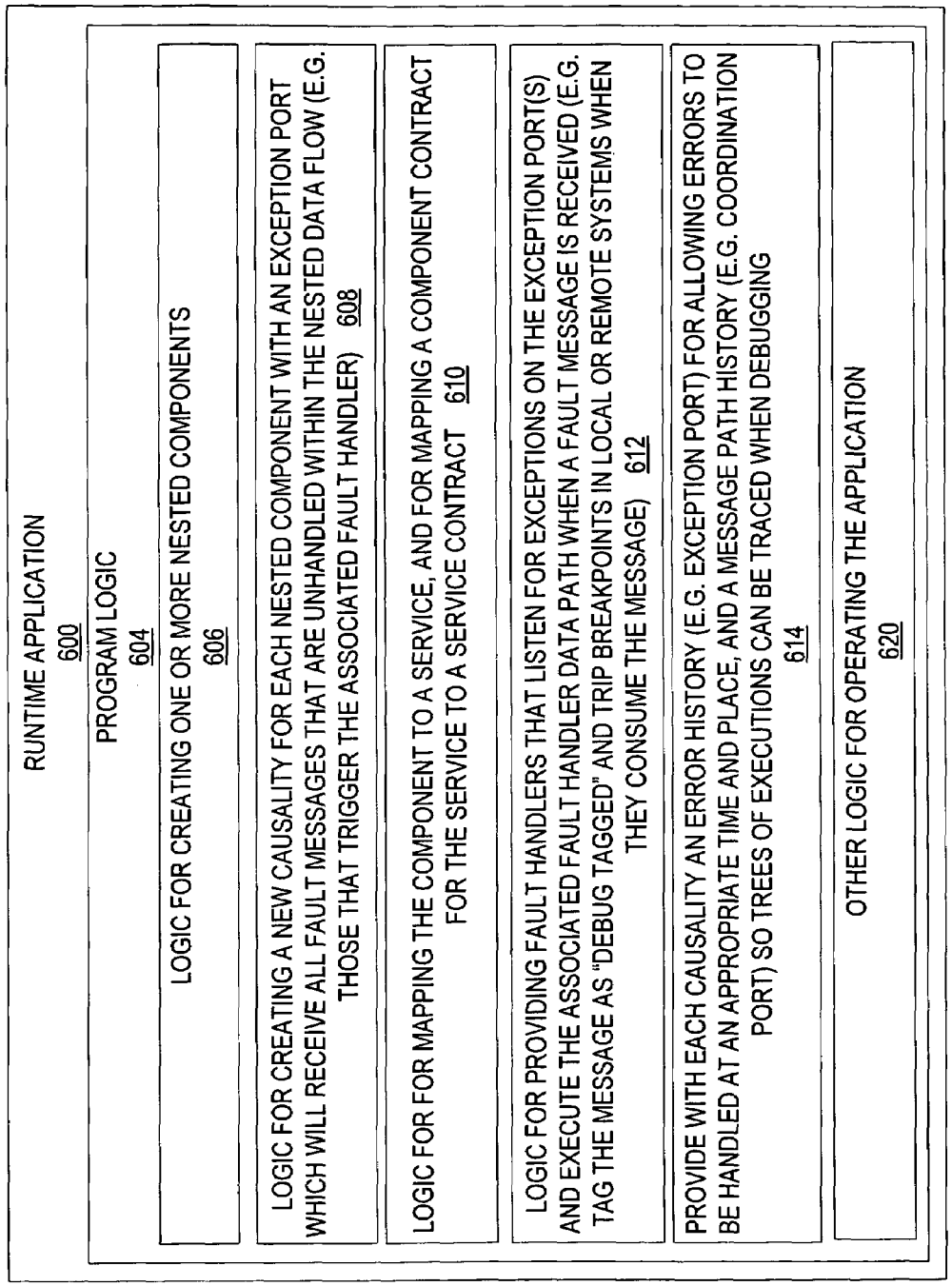
FIG. 12 is a diagrammatic view of a runtime application of one implementation operating on the computer system of FIG. 1.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes data flow application 200 and/or runtime application 600. Data flow application 200 may operate on the same or different computing device than runtime application 600, but both are shown on the same computing device 100 for the sake of clarity. Data flow application 200 will be described in further detail in FIG. 2, and runtime application 600 will be described in further detail in FIG. 12.

Figure 2:
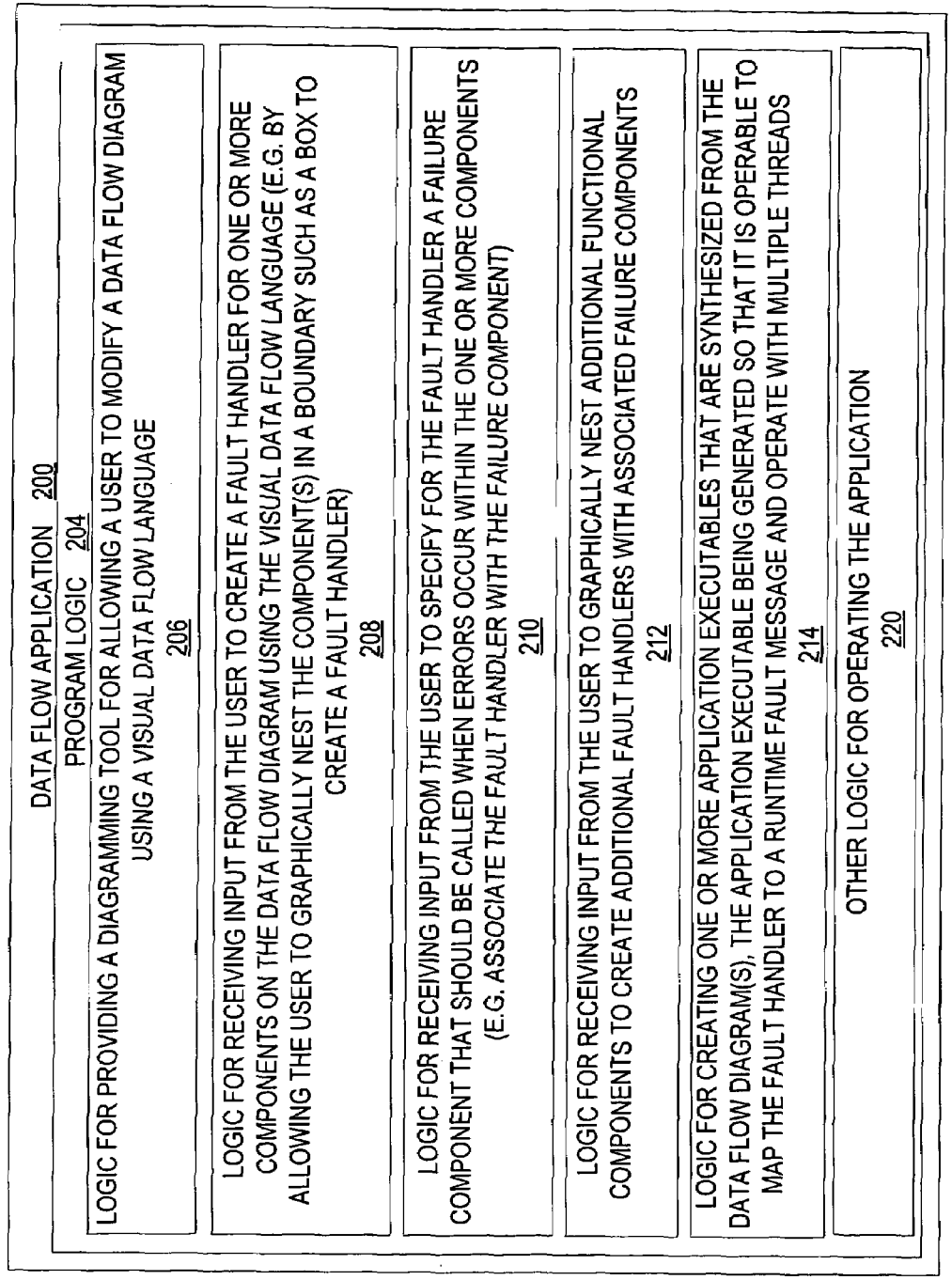
FIG. 2 is a diagrammatic view of a data flow application of one implementation operating on the computer system of FIG. 1.

Turning now to FIG. 2 with continued reference to FIG. 1, a data flow application 200 operating on computing device 100 is illustrated. Data flow application 200 is one of the application programs that reside on computing device 100. However, it will be understood that data flow application 200 can alternatively or additionally be embodied as computer-executable instructions on one or more computers and/or in different variations than shown on FIG. 1. Alternatively or additionally, one or more parts of data flow application 200 can be part of system memory 104, on other computers and/or applications 115, or other such variations as would occur to one in the computer software art.

Data flow application 200 includes program logic 204, which is responsible for carrying out some or all of the techniques described herein. Program logic 204 includes logic for providing a diagramming tool for allowing a user to modify a data flow diagram using a visual data flow language 206; logic for receiving input from the user to create a fault handler for one or more components on the data flow diagram using the visual data flow language (e.g. by allowing the user to graphically nest the component[s] in a boundary such as a box to define a causality to which a fault handler can be assigned) 208; logic for receiving input from the user to specify for the fault handler a failure component that should be called when errors occur within the one or more components (e.g. associate the fault handler with the failure component) 210; logic for receiving input from the user to graphically nest additional functional components to create additional fault handlers with associated failure components 212; logic for creating one or more application executables that are synthesized from the data flow diagram(s), the application executable being generated so that it is operable to map the fault handler to a runtime fault message and operate with multiple threads 214; and other logic for operating the application 220. In one implementation, program logic 204 is operable to be called programmatically from another program, such as using a single call to a procedure in program logic 204.

A few non-limiting examples will be provided as an introduction to some of the concepts related to data flow application 200 and/or some or all of the stages described in FIGS. 3-6. For example, elements of a data flow are functional components (represented by boxes or another suitable indicator) that communicate using asynchronous messages (represented by lines or another suitable indicator). The types of messages that a component can receive, send in response, or output is the components contract. The contract restricts how lines connect different boxes. A boundary box groups component interaction into causalities. Communication may be parallel (non-transitive lines). Components may be executed on different nodes. Components may be nested, such as to contain a data flow comprising components and communication.

Figure 3:
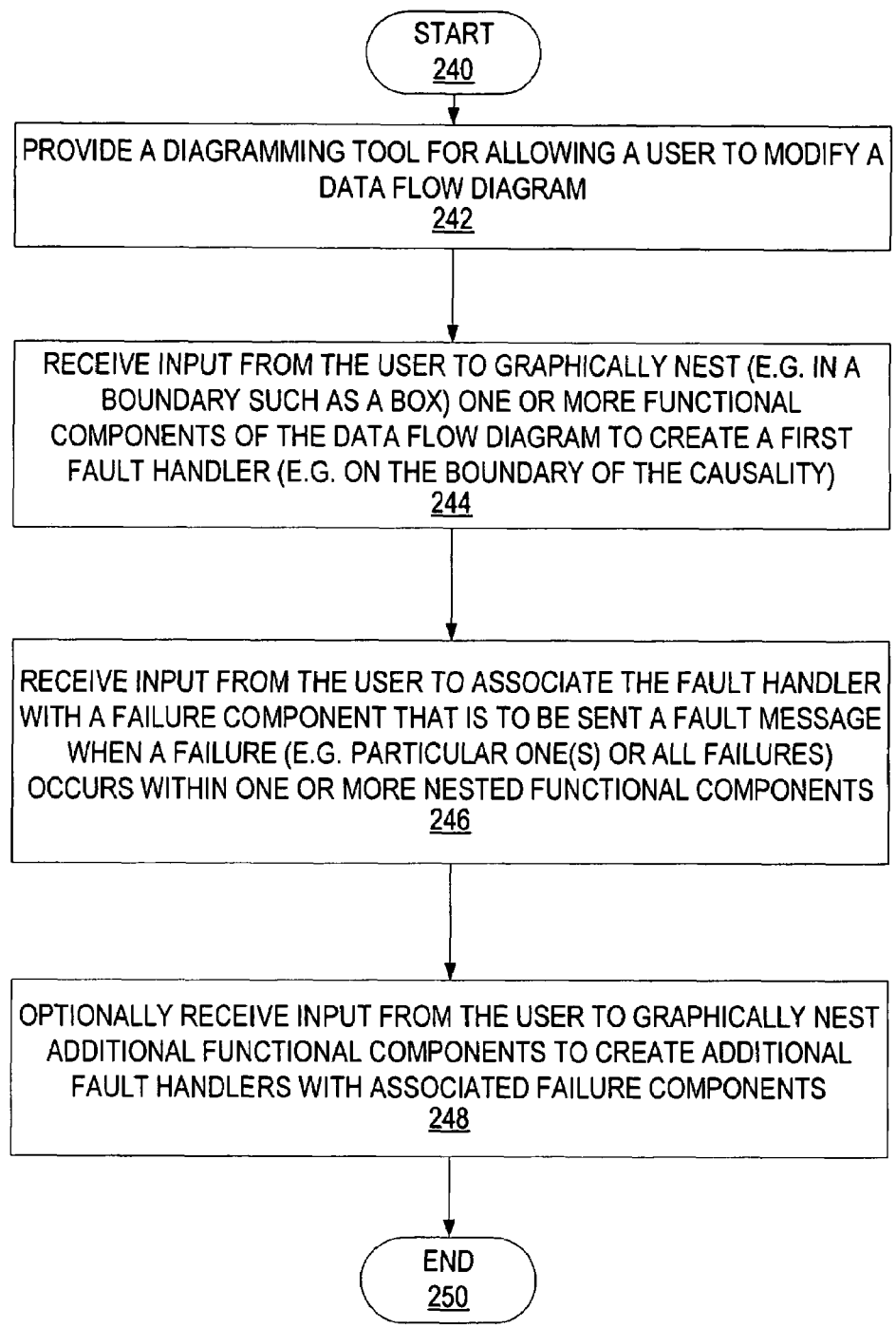
FIG. 3 is a high-level process flow diagram for one implementation of the system of FIG. 1 illustrating the stages involved in creating nested fault handlers using a data flow diagram.

Turning now to FIGS. 3-6 with continued reference to FIGS. 1-2, the stages for implementing one or more implementations of data flow application 200 are described in further detail. FIG. 3 is a high level process flow diagram for data flow application 200 illustrating the stages involved in creating nested fault handlers using a data flow diagram. In one form, the process of FIG. 3 is at least partially implemented in the operating logic of computing device 100. The procedure begins at start point 240 with providing a diagramming tool for allowing a user to modify a data flow diagram (stage 242). The system receives input from the user to graphically nest (e.g. in a boundary such as a box) one or more functional components of the data flow diagram in a causality to create a first fault handler (e.g. on the boundary of the causality) (stage 244). A causality groups message-based interactions between components. The grouping criteria is the original message that caused the other interactions. Interactions in the same causality may be executed in parallel. Interactions in the same causality may be executed on different nodes at runtime. In one implementation, causalities can allow nesting and transitive flow just as exception handling does in a single thread stack. In one implementation, a compensating transaction can be built with causalities.

The system receives input from the user to associate the fault handler with a failure component that is to be sent a fault message when a failure (e.g. particular one(s) or all failures) occurs within one or more nested functional components (stage 246). The system optionally receives input from the user to graphically nest additional functional components to create additional fault handlers with associated failure components (stage 248). The process ends at end point 250.

Figure 4:
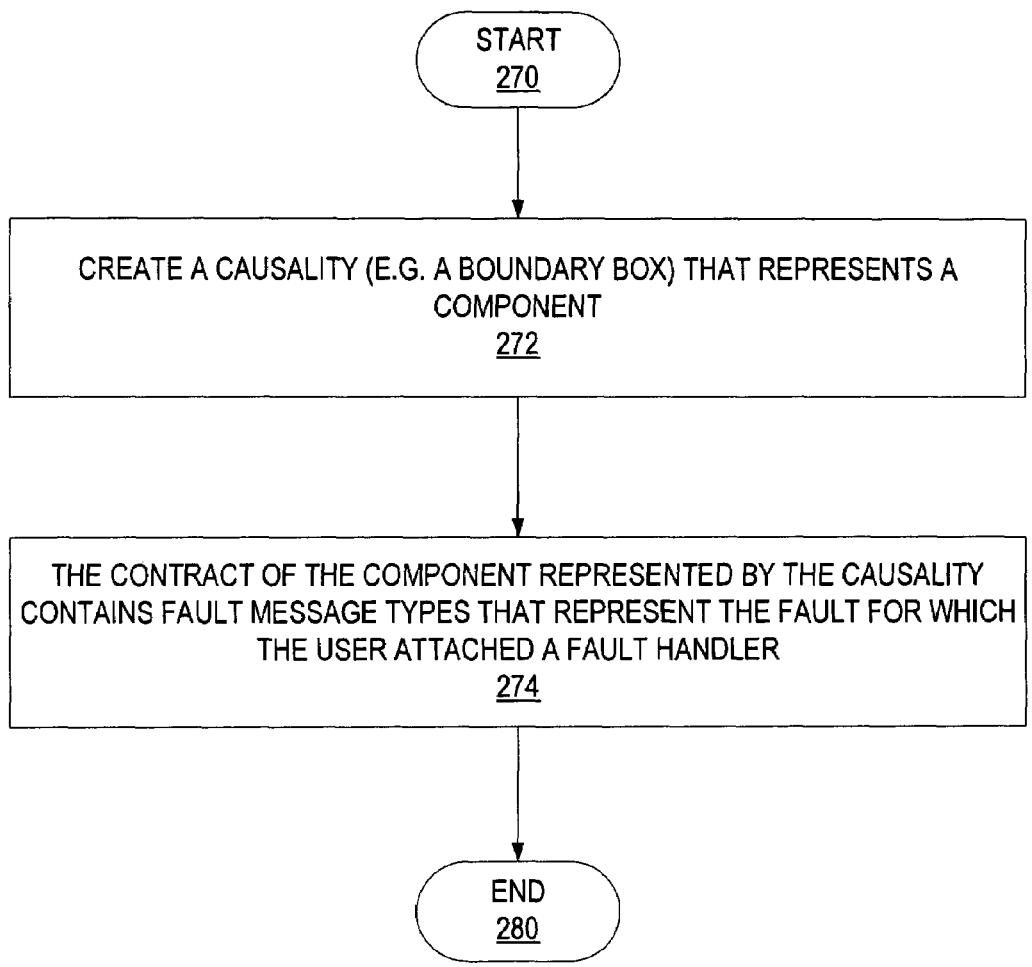
FIG. 4 is a process flow diagram for one implementation of the system of FIG. 1 illustrating the stages involved in associating contracts for nested components with fault message types.

FIG. 4 illustrates one implementation of the stages involved in associating contracts for nested components with fault message types. In one form, the process of FIG. 4 is at least partially implemented in the operating logic of computing device 100. The procedure begins at start point 270 with creating a causality (e.g. a boundary box) that represents a component (stage 272). The contract of the component represented by the causality contains the one or more fault message types that represent the fault for which the user has attached a fault handler (stage 274). The process ends at end point 280.

Figure 5:
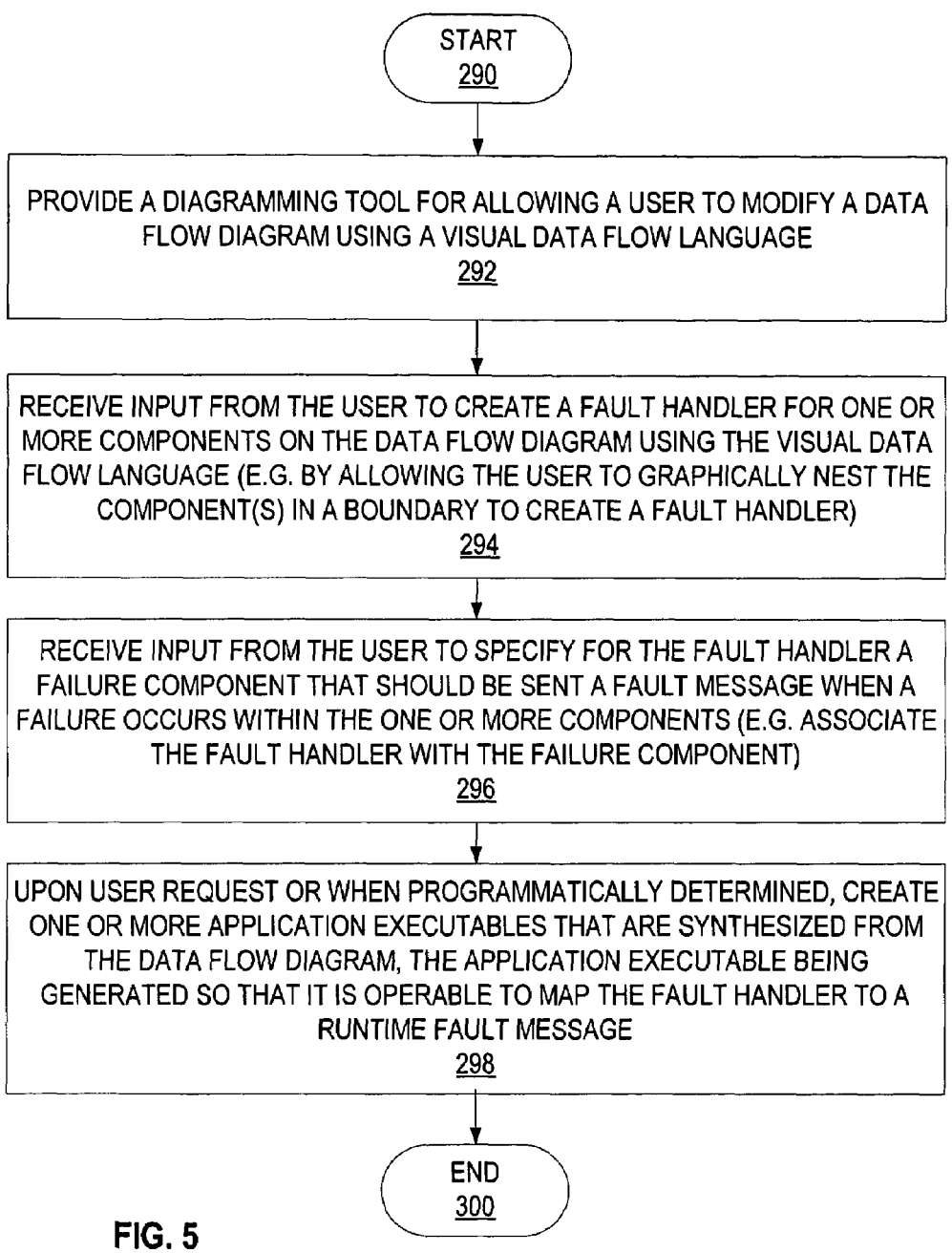
FIG. 5 is a process flow diagram for one implementation of the system of FIG. 1 illustrating the more detailed stages involved in creating fault handlers using a data flow diagram and mapping them to a runtime system.

FIG. 5 illustrates one implementation of the more detailed stages involved in creating fault handlers using a data flow diagram and mapping them to a runtime system. In one form, the process of FIG. 5 is at least partially implemented in the operating logic of computing device 100. The procedure begins at start point 290 with providing a diagramming tool for allowing a user to modify a data flow diagram using a visual data flow language (stage 292). The system receives input from the user to create a fault handler for one or more components on the data flow diagram using the visual data flow language (e.g. by allowing the user to graphically nest the component[s] in a causality boundary to create a fault handler (stage 294). The system receives input from the user to specify for the fault handler a failure component that should be sent a fault message when a failure occurs within the causality (e.g. associates the fault handler with the failure component) (stage 296). Upon user request or when programmatically determined, the system creates one or more application executables that are synthesized from the data flow diagram (stage 298). The application executable is generated so that it is operable to map the fault handler to a runtime fault message (stage 298). The process ends at end point 300.

Figure 6:
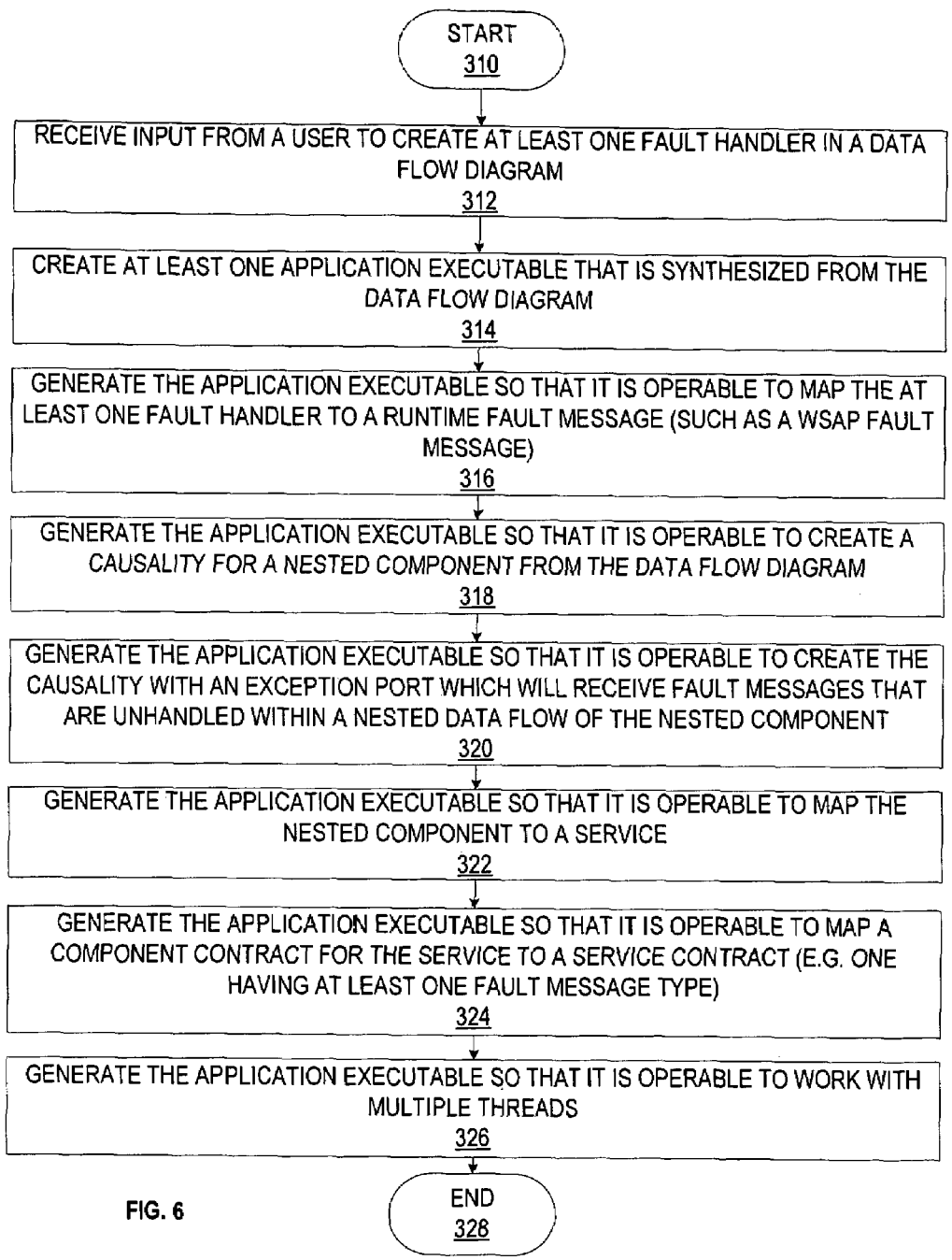
FIG. 6 is a process flow diagram for one implementation of the system of FIG. 1 illustrating the stages involved in mapping fault handlers in a data flow diagram to a runtime system.

FIG. 6 illustrates one implementation of the stages involved in mapping fault handlers in a data flow diagram to a runtime system. In one form, the process of FIG. 6 is at least partially implemented in the operating logic of computing device 100. The procedure begins at start point 310 with receiving input from a user to create at least one fault handler for a causality in a data flow diagram (stage 312). One or more application executables are synthesized from the data flow diagram (stage 314). The application executable is generated so that it is operable to map the at least one fault handler to a runtime fault message (such as a lightweight fault message that can be sent using a standardized communication protocol) (stage 316). The application executable is generated so that it is operable to create a causality for a nested component from the data flow diagram (stage 318), and so that it is operable to create the causality with an exception port which will receive fault messages that are unhandled within a nested data flow of the nested component (stage 320). The application executable is generated so that it is operable to map the nested component to a service (stage 322), and to map a component contract for the service to a service contract (e.g. one having at least one fault message type) (stage 324). The application executable is also generated so that it is operable to work with multiple threads (stage 326). The process ends at end point 328.

Figure 7:
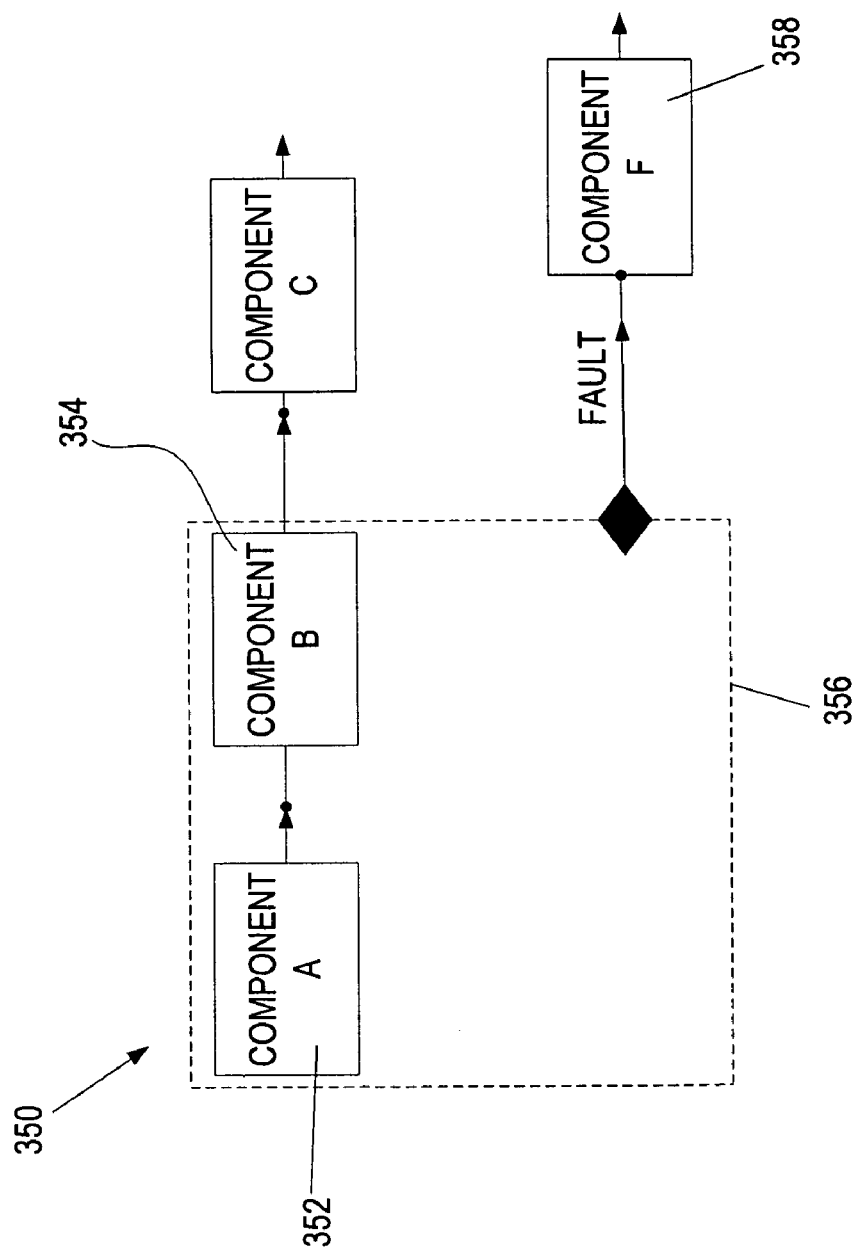
FIG. 7 is a logical diagram for one implementation of the system of FIG. 1 that illustrates a single nested component within a causality and a corresponding failure component.
Figure 8:
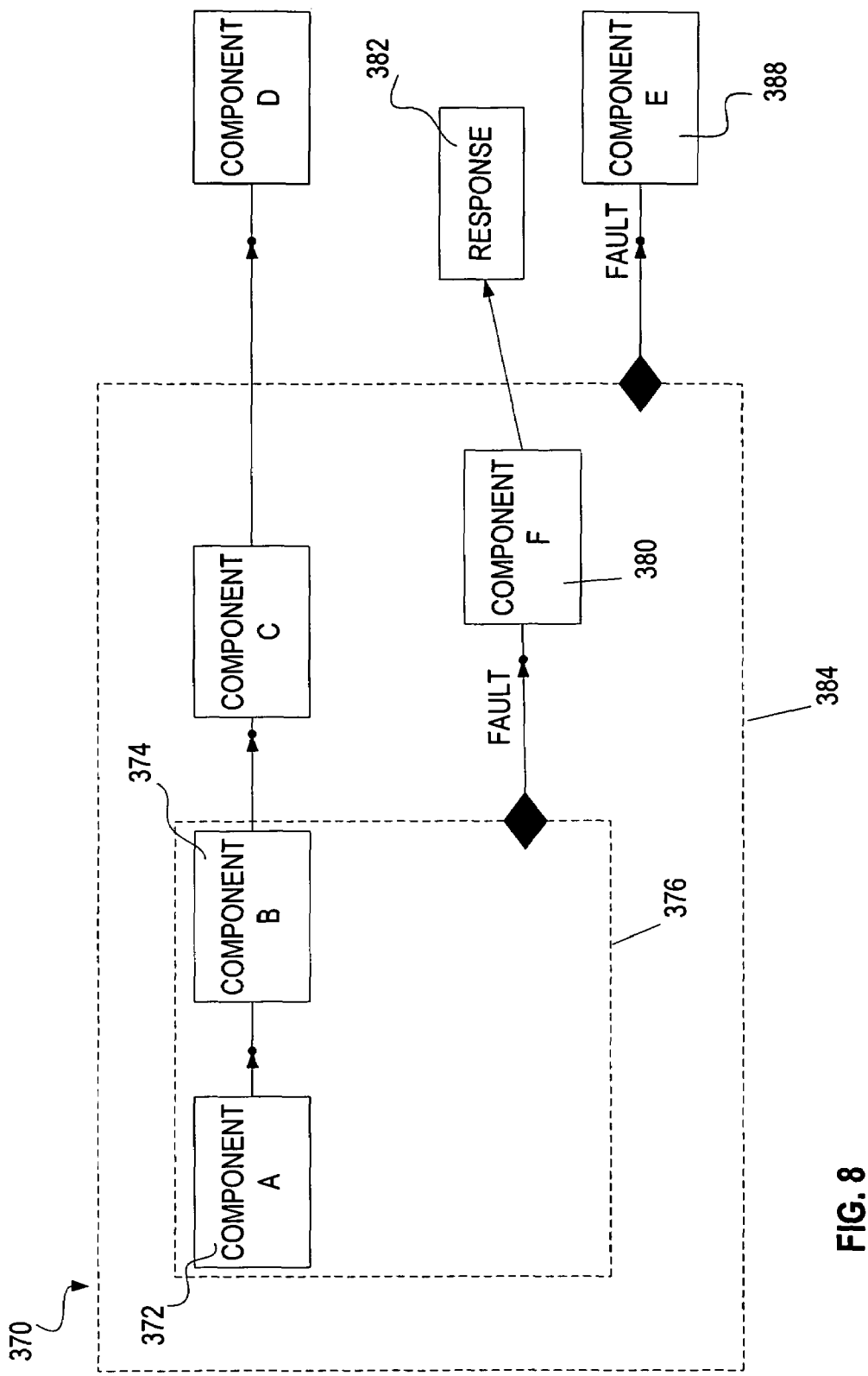
FIG. 8 is a logical diagram for one implementation of the system of FIG. 1 that illustrates multiple nested components within a causality and corresponding failure components.

FIGS. 7-11 are logical diagrams and simulated screens that illustrate nested components within a causality and a corresponding failure component. In one implementation, these diagrams and/or screens are implemented within a data flow diagramming tool to allow a user to graphically create failure handling scenarios that are then synthesized into one or more executables. FIG. 7 is a logical diagram 350 that illustrates one implementation of a single nested component within a causality and a corresponding failure component. Diagram 350 includes two components (352 and 354, respectively) that are nested within a causality boundary create a fault handler 356. The fault handler is associated with the failure component 358 (called "Component F"). Whenever an unhandled error occurs within Component A (352) or Component B (354), the fault handler 356 will receive a fault message that it will forward to the Failure Component 358. FIG. 8 is a logical diagram 370 illustrates multiple nested components within a causality and its corresponding failure components. Diagram 370 has a first causality with a failure handler 376 for Components A (372) and B (374). Any unhandled error that occurs within the first causality will trigger a fault message to be forwarded to Failure Component 380.

Figure 9:
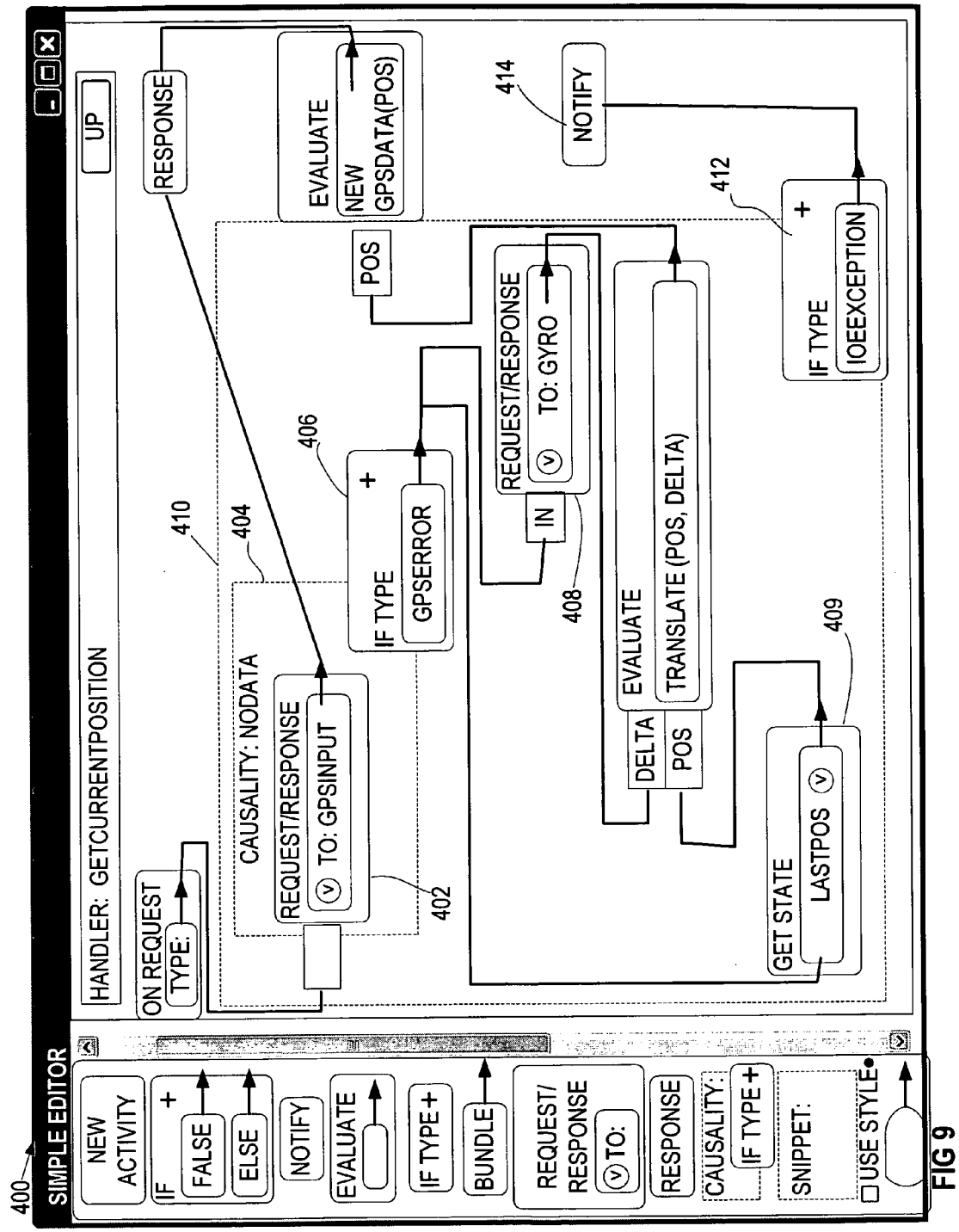
FIG. 9 is a simulated screen for one implementation of the system of FIG. 1 that illustrates multiple nested components within a causality and corresponding failure components.
Figure 10:
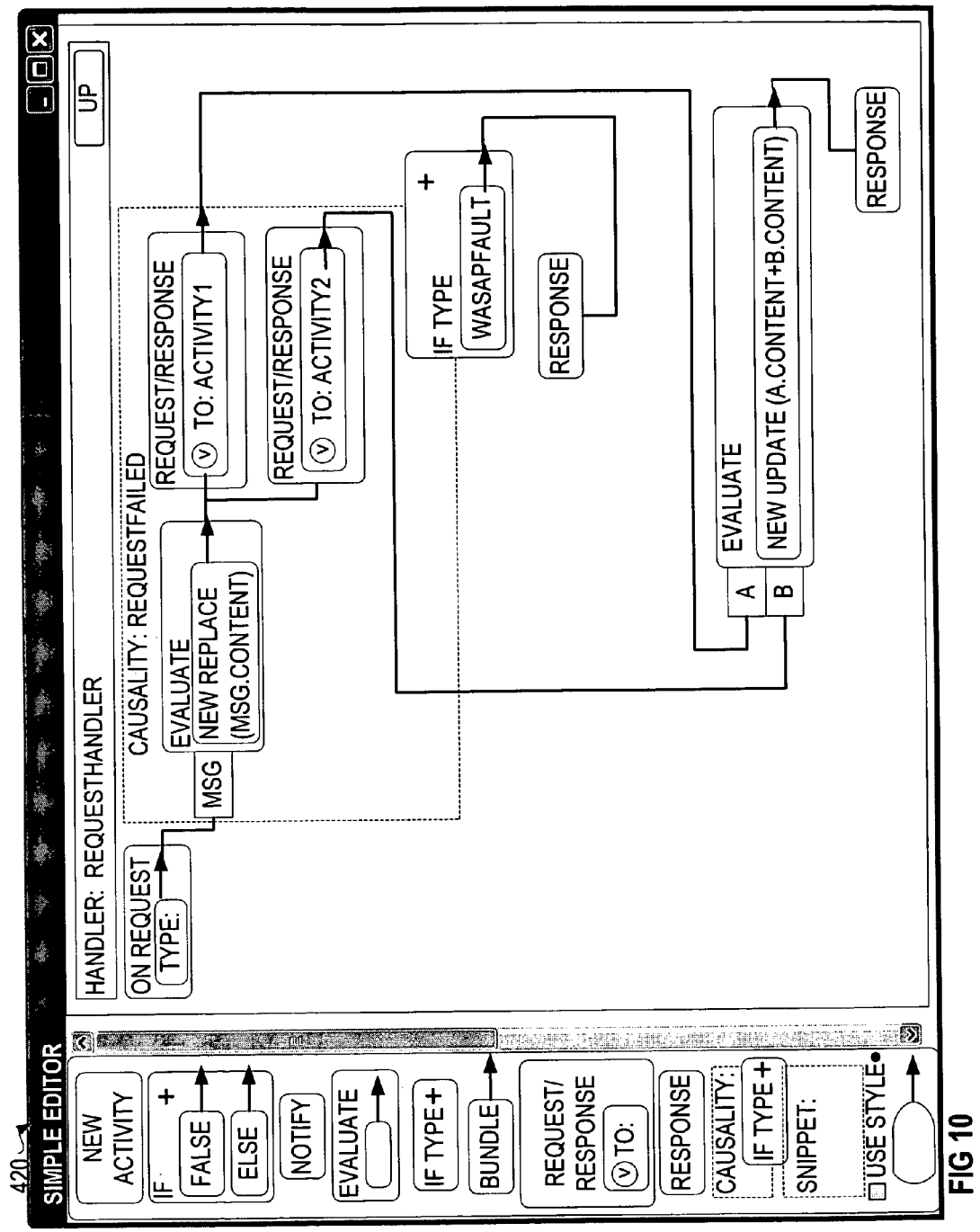
FIG. 10 is a simulated screen for one implementation of the system of FIG. 1 that illustrates a single nested component within a causality and corresponding failure component.
Figure 11:
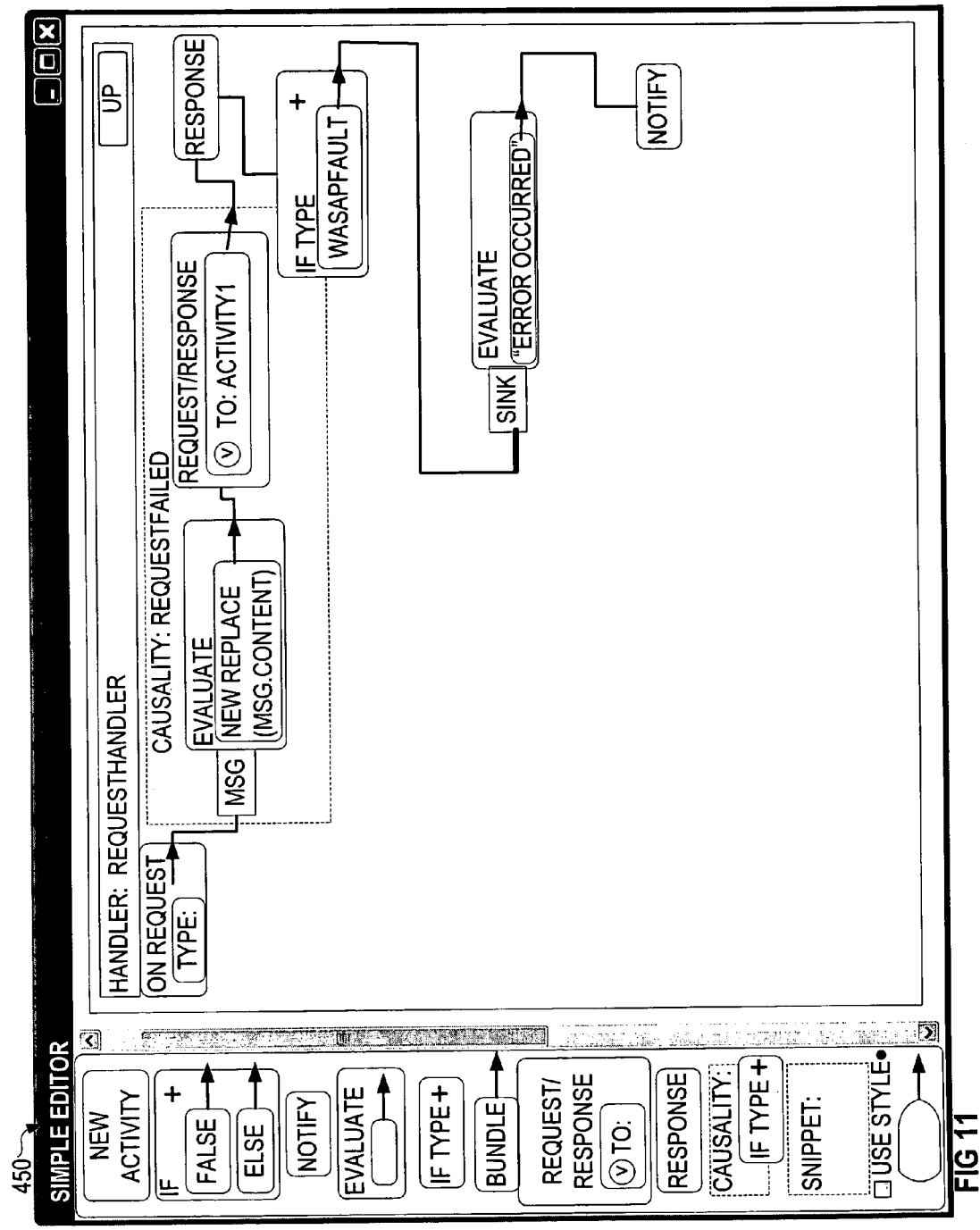
FIG. 11 is a simulated screen for one implementation of the system of FIG. 1 that illustrates another variation of a single nested component within a causality and corresponding failure component.

Turning now to FIGS. 9-11, simulated screens are shown to illustrate a user interface that allows a user to create nested components in causalities with fault handlers using data flow application 200. These screens can be displayed to users on output device(s) 111. Furthermore, these screens can receive input from users from input device(s) 112.

FIG. 9 shows a simulated screen 400 of one implementation that illustrates multiple nested components within a causality and corresponding failure components. Screen 400 shows a first component 402 inside a first causality boundary 404, with a fault handler 406 that is associated with multiple failure components (408 and 409). A second causality boundary 410 surrounds the first causality boundary, and also has a fault handler 412 with a corresponding failure component 414. FIG. 10 is a simulated screen 420 which illustrates a single nested component within a causality and a corresponding failure component. FIG. 11 is a simulated screen 450 that illustrates another variation of a single nested component within a causality and a corresponding failure component. These simulated screens are just illustrative in nature, and numerous other variations could be used for visually allowing a user to indicate causality boundaries, fault handlers, failure components, and/or other user interface details.

Turning now to FIGS. 12-17, a runtime application 600 and various technologies and techniques associated with or related to runtime application 600 are described. Any or all parts of these technologies or techniques could alternatively or additionally be included as part of data flow application 200 and/or the processes and/or screens described in the prior figures. In one implementation, data flow application 200 is used to generate one or more application executables that are used by runtime application 600.

Runtime application 600 includes program logic 604, which is responsible for carrying out some or all of the techniques described herein. Program logic 604 includes logic for creating one or more nested components 606; logic for creating a new causality for each nested component with an exception port which will receive all fault messages that are unhandled within the nested data flow (e.g. those that trigger the associated fault handler) 608; logic for mapping the component to service, and for mapping a component contract for the service to a service contract 610; logic for providing fault handlers that listen for exceptions on the exception port(s) and execute the associated fault handler data path when a fault message is received (e.g. tag the message as "debug tagged" and trip breakpoints in local or remote system when they consume the message) 612; provide with each causality an error history (e.g. exception port) for allowing errors to be handled at an appropriate time and place, and a message path history (e.g. coordination port) so trees of executions can be traced when debugging 614; and other logic for operating the application 620.

Figure 13:
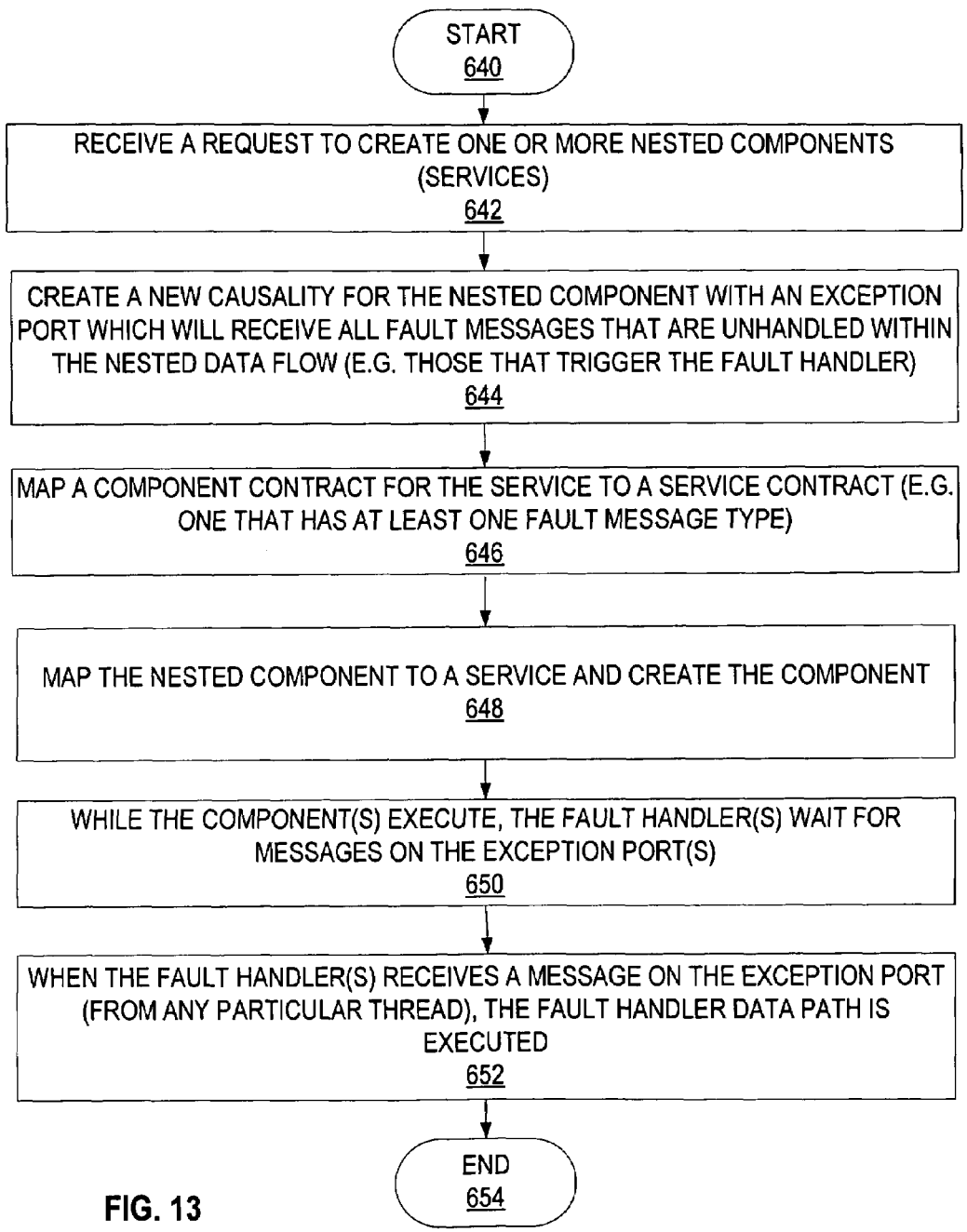
FIG. 13 is a process flow for one implementation of the system of FIG. 1 that illustrates the stages involved in creating causalities with fault handlers.

FIG. 13 illustrates one implementation of the stages involved in creating causalities with fault handlers. In one form, the process of FIG. 13 is at least partially implemented in the operating logic of computing device 100. The procedure begins at start point 640 with receiving a request to create one or more nested components (services) (stage 642). A new causality is created for the nested component with an exception port which will receive all fault messages that are unhandled within the nested data flow (e.g. those that trigger the fault handler) (stage 644). A component contract for the service is mapped to the service contract (e.g. one that has at least one fault message type) (stage 646), and the nested component is mapped to a service (stage 648). The component is created (stage 648), and execution begins. While the component(s) execute, the fault handler(s) wait for messages on the exception port(s) (stage 650). When the fault handler(s) receives a message on the exception port (from any particular thread), the fault handler data path is executed (stage 652). The process ends at end point 654.

Figure 14:
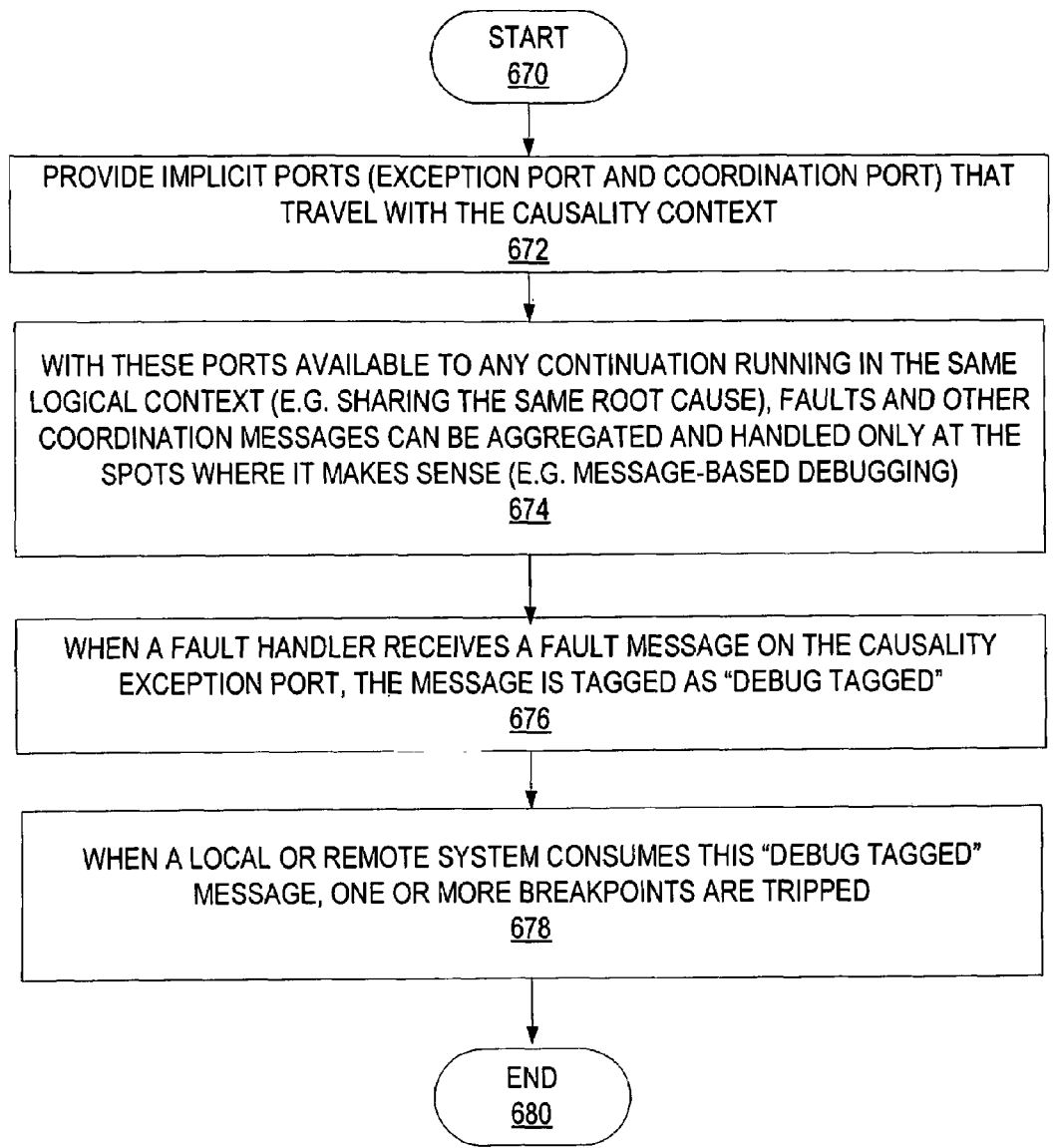
FIG. 14 is a process flow for one implementation of the system of FIG. 1 that illustrates the stages involved in handling debug tagged messages.

FIG. 14 illustrates one implementation of the stages involved in handling debug tagged messages. In one form, the process of FIG. 14 is at least partially implemented in the operating logic of computing device 100. The procedure begins at start point 670 with providing implicit ports (exception port and coordination port) that travel with the causality context (stage 672). With these ports available to any continuation running in the same logical context (e.g. sharing the same root cause), faults and other coordination messages can be aggregated and handled only at the spots where it makes sense (e.g. message-based debugging) (stage 674). When a fault handler receives a fault message on the causality exception port, the message is tagged as "debug tagged" (stage 676). When a local or remote system consumes this "debug tagged" message, one or more breakpoints are tripped (stage 678). The process ends at end point 680.

Figure 15:
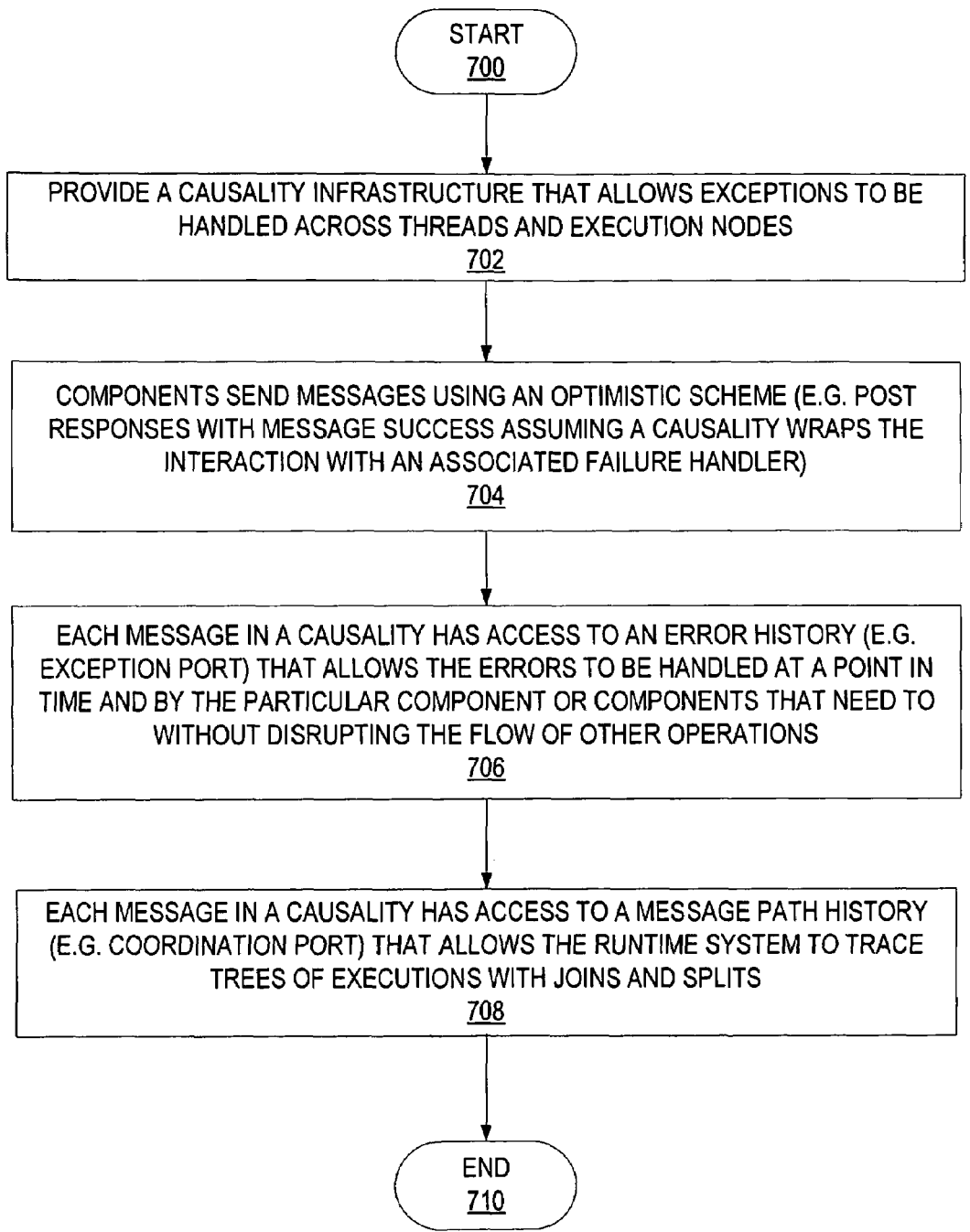
FIG. 15 is a process flow for one implementation of the system of FIG. 1 that illustrates the stages involved in providing a causality infrastructure that allows exceptions to be handled across threads and execution nodes.

FIG. 15 illustrates one implementation of the stages involved in providing a causality infrastructure that allows exceptions to be handled across threads and execution nodes. In one form, the process of FIG. 15 is at least partially implemented in the operating logic of computing device 100. The procedure begins at start point 700 with providing a causality infrastructure that allows exceptions to be handled across threads and execution nodes (stage 702). Components send messages using an optimistic scheme (e.g. they post responses with message success assuming that a causality wraps the interaction with an associated failure handler) (stage 704). Each message in a causality has access to an error history (e.g. exception port) that allows the errors to be handled at a point in the time and by the particular component or components that need to without disrupting the flow of other operations (stage 706). Each message in a causality context has access to as a message path history (e.g. coordination port) that allows the runtime system to trace trees of executions with joins and splits (stage 708). The process ends at end point 710.

Figure 16:
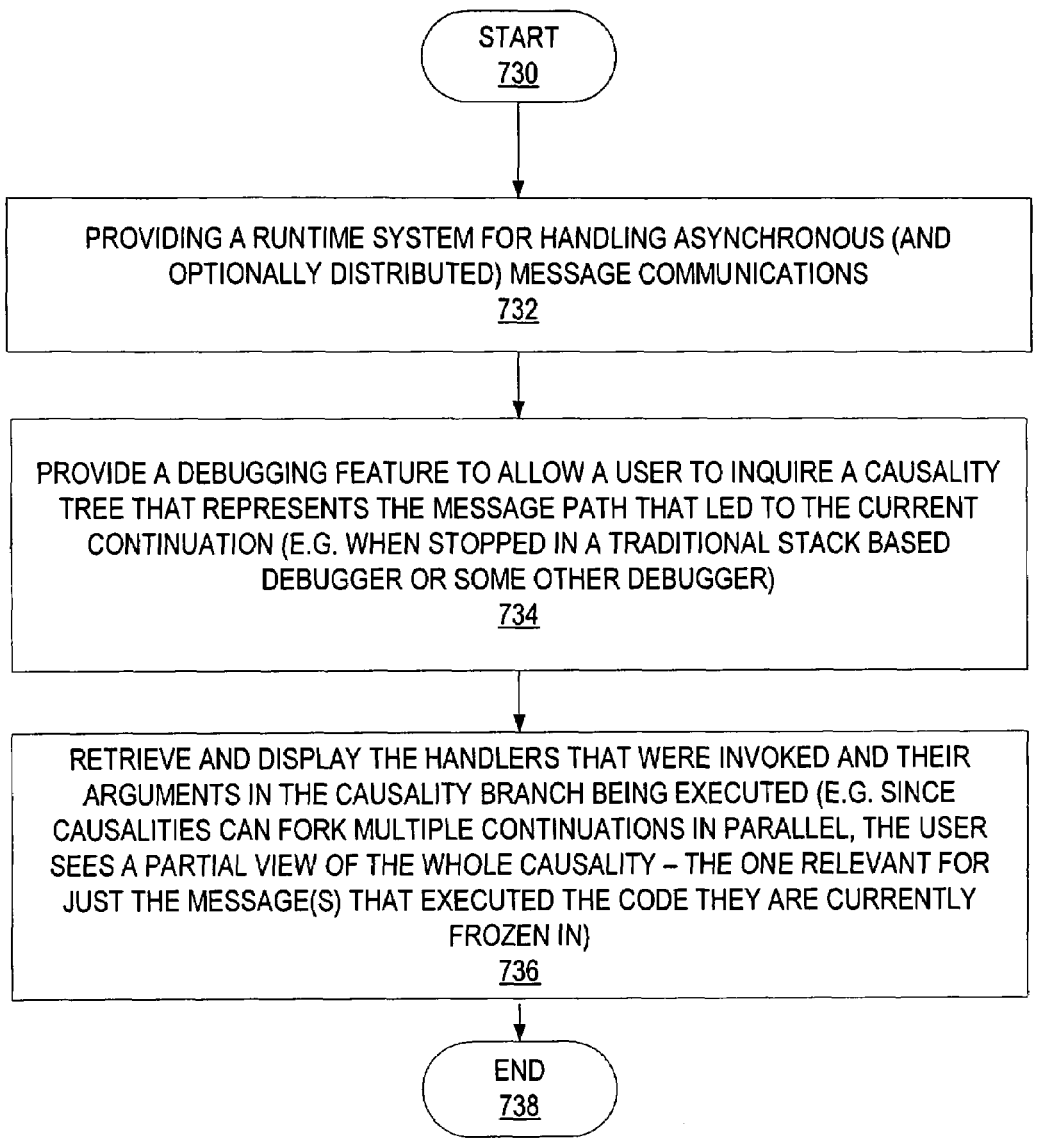
FIG. 16 is a process flow for one implementation of the system of FIG. 1 that illustrates the stages involved in debugging an asynchronous message communication path.

FIG. 16 illustrates one implementation of the stages involved in debugging an asynchronous message communication path. In one form, the process of FIG. 16 is at least partially implemented in the operating logic of computing device 100. The procedure begins at start point 730 with providing a runtime system for handling asynchronous (and optionally distributed) message communications (stage 732). A debugging feature is provided to allow a user to inquire a causality tree that represents the message path that led to the current continuation (e.g. when stopped in a traditional stack based debugger or some other debugger) (stage 734). The system retrieves information (e.g. from the coordination and/or exception ports) and displays the handlers that were invoked and their arguments in the causality branch being executed (stage 736). In one implementation, since causalities can fork multiple continuations in parallel, the user just sees a partial view of the whole causality (e.g. the one relevant for just the message(s) that executed the code they are currently frozen in) (stage 736). The process ends at end point 738.

Figure 17:
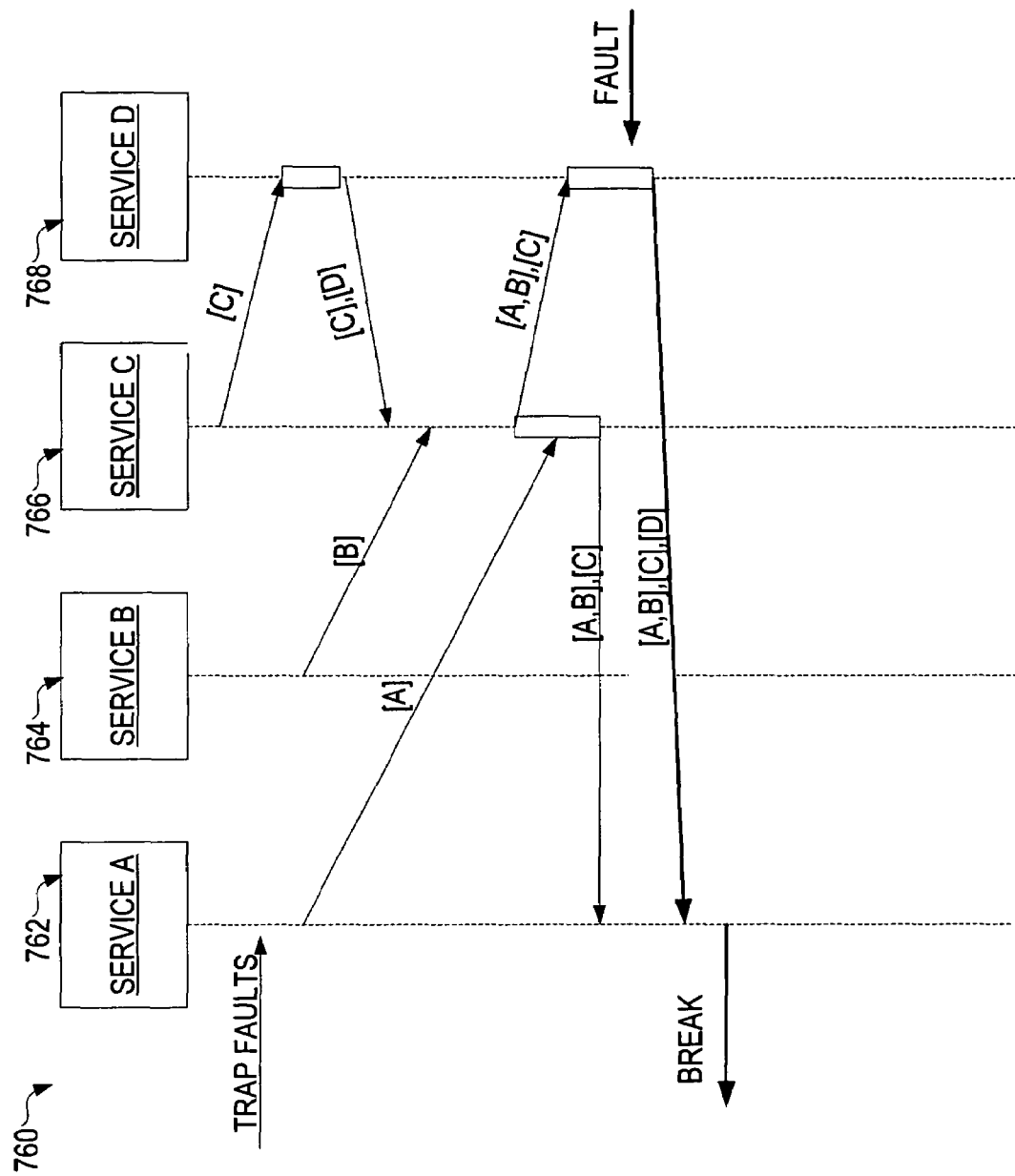
FIG. 17 is a logical diagram for one implementation of the system of FIG. 1 that illustrates the flow of faults within a logical context.

FIG. 17 is a logical diagram 760 for one implementation that illustrates the flow of faults within a logical context. As messages flow across components (762, 764, 766, and 768), and as errors occur, faults are detected and handled accordingly.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for handling errors in a computer comprising the steps of:
  receiving a request to create at least one nested component;
  creating a causality for the nested component, the causality having an exception port which is operable to receive one or more fault messages that are unhandled within a nested data flow associated with the nested component, the nested data flow comprising a flow of operations, wherein the exception port has an error history storing messages received on the exception port, and wherein the error history allows an error to be handled at an appropriate time and place without disrupting the flow of other operations of the nested data flow;
  creating the nested component;
  receiving a fault message on the exception port; and
  executing a fault handler data path when the message is received.

2. The method of claim 1, wherein the exception port travels with the causality.

3. The method of claim 1, wherein the causality has a coordination port that travels with the causality.

4. The method of claim 3, wherein the coordination port has a message path history tracing at least one tree of execution.

5. The method of claim 4, wherein the message path history provides a partial view of the causality that is relevant to a particular set of code that is frozen by a debugging operation.

6. The method of claim 1, wherein the fault handler data path is executed by performing an operation specified by a fault handler associated with the causality.

7. The method of claim 6, wherein the operation includes sending at least one message to a component specified in the fault handler.

8. The method of claim 6, wherein the operation includes adding a debug tag to a message associated with the component.

9. A computer-readable storage medium having computer-executable instructions for causing a computer to perform steps comprising:

create a causality for a nested component of a data flow that is associated with the causality, the causality having an exception port that is operable to receive a fault message that is unhandled within the data flow;

provide a fault handler that is operable to listen for the fault message on the exception port and execute an associated fault handler data path when the fault message is received; and provide an exception port that is accessible by messages associated with the causality, wherein the exception port is operable to track an error history, and wherein the error history is operable to allow errors to be aggregated and then handled at an appropriate time and place without disrupting a current flow of execution.

10. The computer-readable storage medium of claim 9, further having computer-executable instructions for causing a computer to further perform a step comprising: provide a coordination port that is accessible by each message associated with the causality.

11. The computer-readable storage medium of claim 10, wherein the coordination port is operable to provide a message path history that can be used by a debugging operation.

12. A method for debugging comprising the steps of:

executing a runtime system that executes data flows comprised of nodes and having paths that can execute in parallel wherein a data flow is executed by asynchronous message communications between the nodes of the data flow;

providing the runtime system with a debugging feature to allow a user to request a causality tree for a given data flow that had an exception; and in response to a user request, providing the causality tree by retrieving debugging information from an error history, the debugging information including one or more handlers that were invoked and arguments for the one or more handlers in a causality branch that was being executed, wherein the debugging information is retrieved from the error history via a port that is associated with a causality of a nested component of the given data flow, the causality having one or more fault handlers that listen for fault messages on the port to track an error history of the given data flow, wherein the error history allows an error to be handled at an appropriate time and place without disrupting a current execution flow.

13. The method of claim 12, further comprising: displaying at least a portion of the debugging information on a display.

* * * * *